(12) United States Patent
Haymond (10) Patent No.: US 10,015,296 B1
(45) Date of Patent: Jul. 3, 2018

(54) LENS COVER (71) Applicant: Handstands Promo, LLC, Salt Lake City, UT (US)

(72) Inventor: Bryce Haymond, West Valley, UT (US)

(73) Assignee: Handstands Promo, LLC, Salt Lake City, UT (US)

( * ) Notice: Subject to any disclaimer, the term of this patent is extended or adjusted under 35 U.S.C. 154(b) by 0 days.

(21) Appl. No.: 15/629,295

(22) Filed: Jun. 21, 2017

(51) Int. Cl.
*G03B 17/00* (2006.01)
*H04M 1/02* (2006.01)

(52) U.S. Cl.
CPC ....... *H04M 1/0264* (2013.01); *H04M 1/0252* (2013.01); *H04M 2250/52* (2013.01)

(58) Field of Classification Search
CPC ...................................................... G03B 17/00
USPC ........................................... 396/448; 359/511
See application file for complete search history.

(56) References Cited

U.S. PATENT DOCUMENTS

| 2015/0015777 A1* | 1/2015 | Osborne | H04N 5/2252 348/373 |
| 2015/0070575 A1* | 3/2015 | Lee | G03B 17/04 348/373 |

\* cited by examiner

*Primary Examiner* — Clayton E Laballe
*Assistant Examiner* — Fang-Chi Chang
(74) *Attorney, Agent, or Firm* — Thorpe, North & Western, LLP (57) ABSTRACT

A lens cover selectively covers and exposes a, camera lens on the back of mobile device, such as a cellular phone. The lens cover can be adhered to the back of the mobile device. The lens cover has a flap that pivots 180 degrees about an axis parallel with the back of the mobile device, and between an open/storage position and a closed position. The flap can be off-set with respect to the axle so that in the open/storage position, the flap is adjacent or abutting to the back of the mobile device, and so that in the closed position, the flap is spaced-apart from the back of the mobile device, creating a gap to receive a protruding camera or camera lens. The flap can also comprise a detent to maintain the flap in a selected position until selectively moved.

18 Claims, 6 Drawing Sheets

LENS COVER

BACKGROUND

Field of the Invention

The present invention relates generally to a lens cover for a mobile device, such as a cellular phone.

Related Art

Many devices, such as cellular phones, have cameras with a camera lens. The mobility and frequent handling of such devices raises concerns over fouling the camera lens with fingerprints, etc. In addition, the ubiquity of cellular phones, and their cameras, raises concerns about privacy.

SUMMARY OF THE INVENTION

It has been recognized that it would be advantageous to develop a lens cover for a camera lens for mobile devices, such as cellular phones, to protect the lens.

The invention provides a lens cover to selectively cover and expose a camera lens on a mobile device. The lens cover comprises a base with an inner side to be affixed to a back of the mobile device. A flap is pivotally coupled to the base about an axle, and has opposite sides. The flap folds 180 degrees about the axle, and between two positions, comprising: 1) an open position, and 2) a closed position. In the open position, a first side of the flap faces outward opposite the inner side of the base, and a second side faces inward, to expose the camera lens. In the closed position, which is adjacent the open position, the flap is folded 180 degrees, and the second side of the flap faces outward opposite the inner side of the base, and the first side faces inward, to cover the camera lens.

In addition, the invention provides a lens cover in combination with a mobile device to selectively cover and expose a camera lens on the mobile device. The lens cover comprises a base ring disposed on a back of the mobile device and circumscribing the camera lens. A flap is pivotally coupled to the base ring by an axle oriented parallel to the back of the mobile device. The flap is positioned to extend across an aperture in the base ring, and divide the aperture of the base ring into a lens side and a storage side. The flap folds about the axle between two positions, comprising: 1) an open position, and 2) a closed position. In the open position, the flap covers the storage side, and is adjacent the back of the mobile device, and the camera lens is exposed. In the closed position, the flap covers the lens side, and is disposed over the camera lens and above the back of the mobile device.

Furthermore, the invention provides a method for selectively covering and exposing a camera lens of a mobile device, comprising: securing a base ring on the back of the mobile device with an aperture of the base ring over the camera lens and with the base ring circumscribing the camera lens; and selectively folding a flap, pivotally coupled to the base ring by an axle parallel with the back of the mobile device, 180 degrees between two positions, including: 1) an open position in which the flap is adjacent the back of the mobile device and the camera lens is exposed; and 2) a closed position in which the flap is disposed over the camera lens and above the back of the mobile device.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 8 is a front elevation view of the lens cover of FIG. 1a;

FIG. 9 is a rear elevation view of the lens cover of FIG. 1a;

FIG. 10 is a top plan view of the lens cover of FIG. 1a;

FIG. 11 is a bottom plan view of the lens cover of FIG. 1a;

FIG. 12 is a left side elevation view of the lens cover of FIG. 1a;

FIG. 13 is a right side elevation view of the lens cover of FIG. 1a;

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The terms "handheld electronic device" and "mobile device" are used interchangeably herein to refer broadly to a portable, hand-held electronic device, including by way of example, a cellular (cell) phone, a smart phone, a tablet computer or tablet, a phablet, a global positioning system (GPS), a mobile media player, a gaming system, a video monitor, and the like. The handheld electronic device can be a cell phone; an MP3 player (iPod® or the like) or other digital music player; a gaming device (Nintendo® DS; PSP®; etc.); a camera; a global positioning system (GPS) system; a personal digital assistant (PDA); a DVD player; a portable television; a digital camera; a video camera; a portable computer (laptop computer, iPad®, or the like); an e-book or e-reader (Kindle®, Nook®, iPad®, Sony Reader™, or the like), etc. Such a device can have a display screen upon which data, information, media, etc. is viewed; one or more inputs, such as buttons, a touch screen, etc.; one or more outputs, such as the screen, a speaker, an audio jack, etc.; one or more cameras; a power supply, such as a battery; a data storage system and a computing system. Such a device can also include a port or socket for receiving a power and/or data connection cord or plug. The mobile device can have a back or back surface, and a front or front surface. The display or touch screen can occupy a great majority of the front of the mobile device. The portable electronic device can be mobile and transportable. The portable electronic device can be carried by a user, such as in a pocket or purse, and also can be held in the user's hand(s).

The term "cellular phone" is used broadly herein to refer to a cellular phone, a cell phone, a smart phone, phablet, etc. Such cellular phones can be portable, handheld communication devices, or mobile devices, that can include a speaker, a microphone, one or more cameras, a transmitter and a receiver (or transceiver), a power supply or battery, a display screen or touch screen display and input device, other input devices, such as one or more buttons, etc. The cellular phone can have a back or back surface, and a front or front surface. The display or touch screen can occupy a great majority of the front of the cellular phone.

In addition, the terms "mobile device" and "cellular phone" are intended to refer to such mobile devices and cellular phones with a case, cover, skin, film, etc. thereon. Cell phones often are used with a case that surrounds the sides and back of the phone. In addition, cell phones can be utilized with skins that adhere or stick to the back and/or sides of the phone. The term "cell phone" is used herein to also refer to such cases or skins. Thus, a description of an item being attached to, affixed to, carried by, and the like, the cell phone or back thereof is intended to include being attached to, affixed to, carried by, and the like, the case or skin or back thereof. Furthermore, the terms "back surface" and "back" are used interchangeably for such mobile devices or cellular phones, and are intended to refer to the actual back or back surface of such devices, and the back or back surface of any case, cover, skin, film, etc. disposed thereon.

The terms "business", "company" are used broadly and interchangeably herein to refer to an organization that provides a product or a service. The business, company or organization can have a name, logo, slogan, trademark, service mark, etc. that is capable of identifying and/or distinguishing the business or company, or product or service, or both, or can otherwise be utilized to market, promote, and/or brand the business or company, or product or service, or both.

DESCRIPTION

A lens cover is provided to selectively cover and expose a camera or camera lens on the back of mobile device, such as a cellular phone. The lens cover can be adhered to the back of the mobile device, or case or skin thereof. The lens cover has a flap that pivots 180 degrees about an axis parallel with the back of the mobile device, and between an open/storage position and a closed position. The flap can be off-set with respect to the axle so that in the open/storage position, the flap is adjacent or abutting to the back of the mobile device, and so that in the closed position, the flap is spaced-apart from the back of the mobile device, creating a gap to receive a protruding camera or camera lens. The flap can also comprise a detent to maintain the flap in a selected position until selectively moved. In one aspect, the lens cover can be sized to cover multiple lenses adjacent one another on the mobile device.

As illustrated in FIGS. 1-15b, a lens cover, indicated generally at 10, in an example implementation in accordance with the invention is shown for use with a mobile device 14, such as a cellular phone. The lens cover 10 comprises a base 18. The base 18 can have an aperture 22 therethrough so that the base is a ring base. The base 18 or ring base can have an oblong annular shape. The base 18 or base ring and the aperture 22 can be sized to surround multiple cameras or camera lenses adjacent one another on the mobile device. The base 18 has an inner side 26 (FIG. 4) and an opposite exposed side. The inner side 26 can have an adhesive thereon, or an adhesive layer, to affix the base 18 to a back 30 of the mobile device 14, or case or skin thereof. In one aspect, the adhesive can be a releasable 3M adhesive. In one aspect, the base 18 can be positioned or located on the back 30 of the mobile device 14 with the aperture over the camera lens 34, and with the base ring circumscribing the camera lens, or lenses. The base 18 can be thin to reduce interference with the operation of the mobile device. In one aspect, the base can have a thickness between the inner and exposed sides less than 5 mm in one aspect, less than 4 mm in another aspect, and less than 3 mm in another aspect. In another aspect, the oblong shape can be rectangular with rounded corners to resist snagging. In another aspect, the outer edge of the base can have a chamfer or a fillet to resist snagging.

In addition, the lens cover 10 comprises a flap 38 pivotally coupled to the base 18. The flap 38 can have an axle 42, defining a pivot axis, about which the flap pivots. The base 18 can carry the flap 38, and the axle 42 can be pivotally coupled to the base. The axle 42 can be oriented parallel with the base 18, the inner side 26 thereof, and the back 30 of the mobile device 14. Thus, the flap 38 can fold about the axle 42. In addition, the axle 42 can be positioned to extend across the aperture 22 of the base 18, and thus dividing the aperture into a lens side 46 and a storage side 50. The lens side 46 of the aperture can be disposed over the camera lens 34. Furthermore, the flap 38 has opposite sides, including first and second sides 54 and 58.

Figures 1A, 1B:
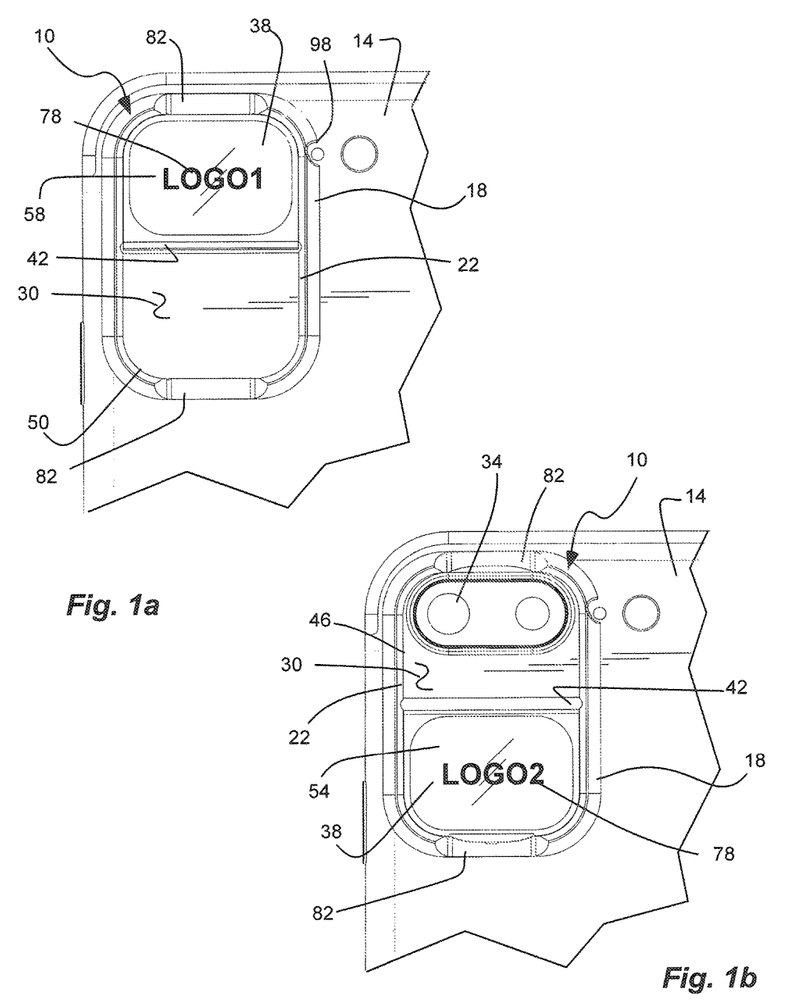
FIG. 1a is a front view of a lens cover in accordance with an embodiment of the present invention, shown on a mobile device, and shown in a closed position.
FIG. 1b is a front view of the lens cover of FIG. 1a, shown in an open position.
Figures 1C, 2A, 2B:
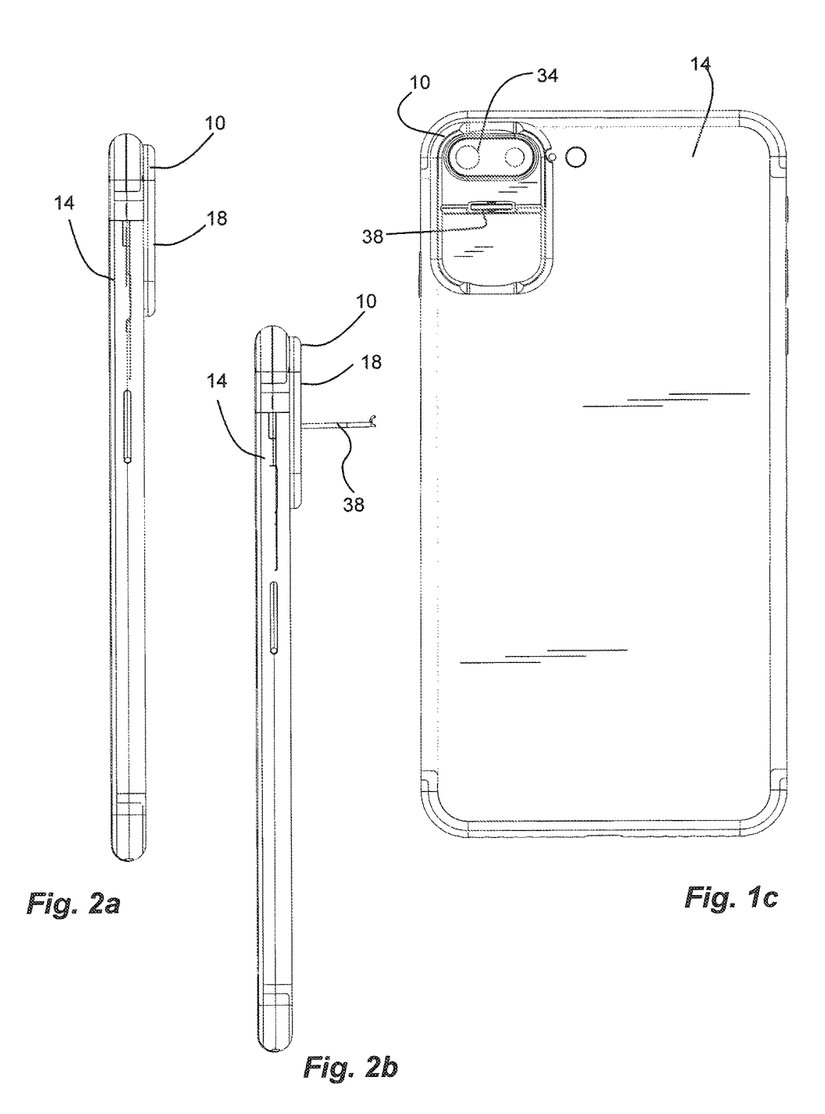
FIG. 1c is a front view of the lens cover of FIG. 1a, shown in an intermediate position.
FIG. 2a is a side view of the lens cover of FIG. 1a, shown on the mobile device.
FIG. 2b is a side view of the lens cover of FIG. 1a, shown in the intermediate position.
Figures 3A, 3B, 4:
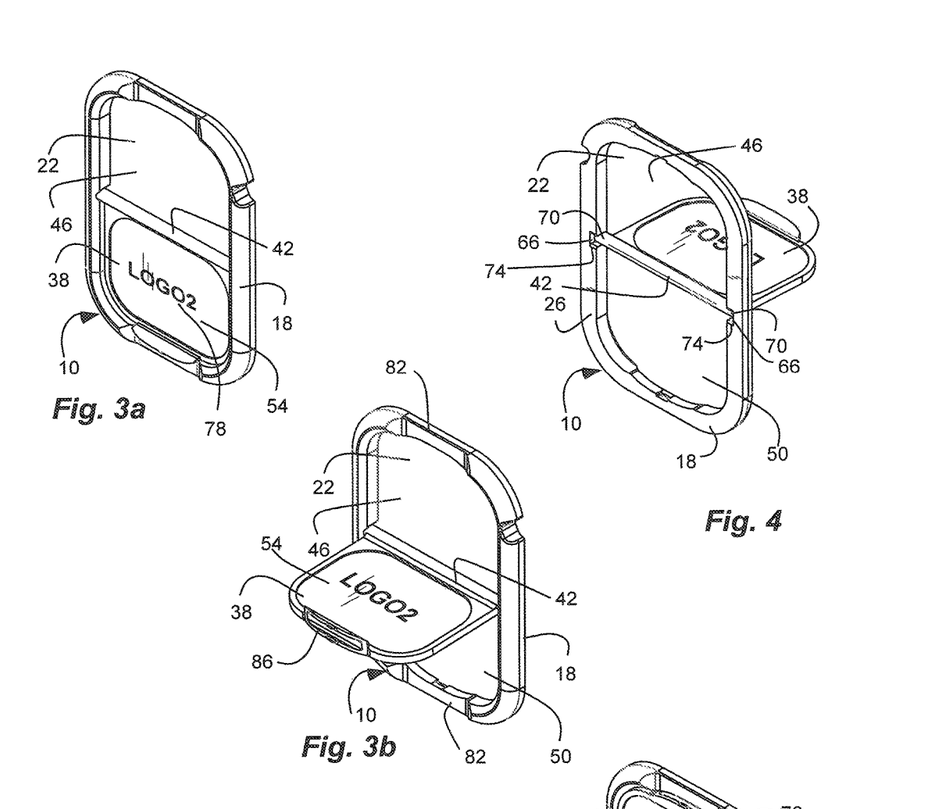
FIG. 3a is a front perspective view of the lens cover of FIG. 1a, shown removed from the mobile device, and shown in the open position.
FIG. 3b is a front perspective view of the lens cover of FIG. 1a, shown removed from the mobile device, and shown in the intermediate position.
FIG. 4 is a rear perspective view of the lens cover of FIG. 1a, shown in the intermediate position.
Figure 3C:
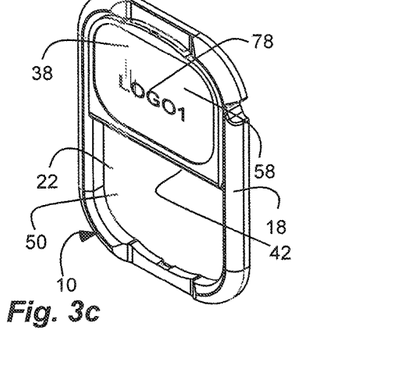
FIG. 3c is a front perspective view of the lens cover of FIG. 1a, shown removed from the mobile device, and shown in the closed position.
Figure 5A:
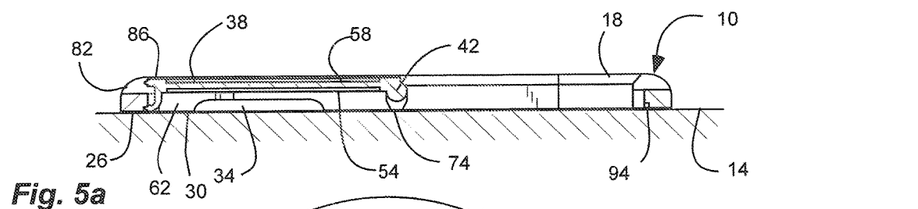
FIG. 5a is a cross-sectional side view of the lens cover of FIG. 1a, shown disposed on the mobile device, and shown in the closed position.
Figure 5B:
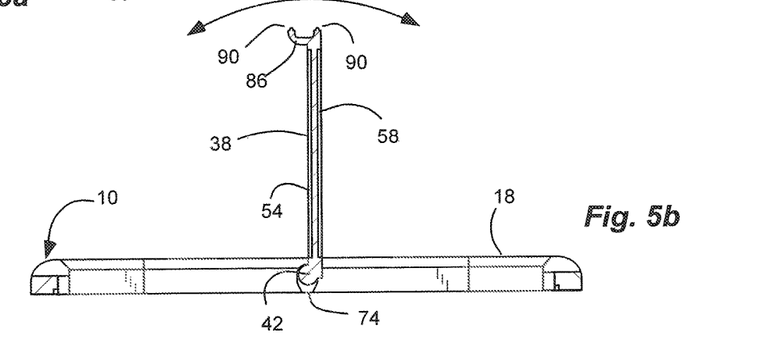
FIG. 5b is a cross-sectional side view of the lens cover of FIG. 1a, shown removed from the mobile device, and shown in the intermediate position.
Figure 5C:
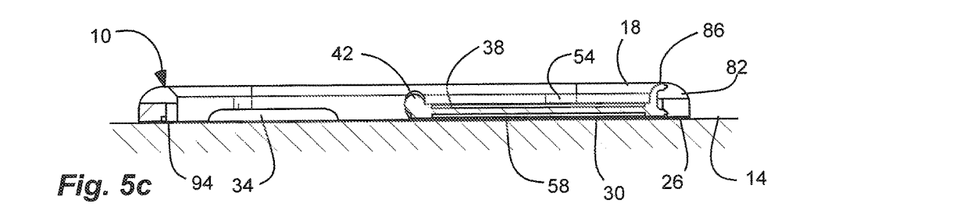
FIG. 5c is a cross-sectional side view of the lens cover of FIG. 1a, shown disposed on the mobile device, and shown in the closed position.
Figure 6:
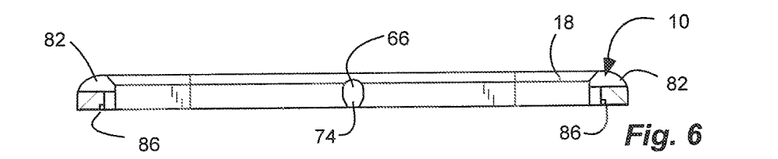
FIG. 6 is a cross-sectional side view of a base ring of the lens cover of FIG. 1a, shown with a flap removed therefrom.

The flap 38 folds or pivots 180 degrees about the axle 42, and between two positions, comprising: 1) an open/storage position, and 2) a closed position. In the open/storage position, shown in FIGS. 1b, 3a, 5c, 8, 14a and 15a, the first side 54 of the flap 38 faces outward, opposite the inner side 26 of the base 18, and the second side 58 faces inward towards the back of the mobile device, and the flap 38 covers the storage side 50 of the aperture 22, and is adjacent the back 30 of the mobile device 14, to expose the camera lens 34. In the closed position, shown in FIGS. 1b, 3c, 5a, 14b and 15b, the flap 38 is folded 180 degrees, and the second side 58 of the flap faces outward, opposite the inner side 26 of the base 18, and the first side 54 faces inward towards the back of the mobile device and the camera lens, and the flap 38 covers the lens side 46 of the aperture 22, and is disposed over the camera lens 34 and above the back 30 of the mobile device 14, to cover the camera lens 34. The open and closed positions of the flap 38 are adjacent one another on opposite sides of the axle 42. In one aspect, the flap 38 can nest within the aperture 22, or the lens side 46 and the storage side 50, of the base ring 18 in both the open position and the closed positions, as shown in FIGS. 5a and 5c. Thus, the flap 38 is protected by the base 18 or ring base, and snagging of the flap is resisted.

Figure 7:
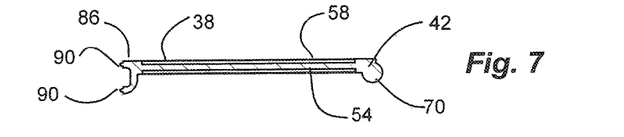
FIG. 7 is a cross-sectional side view of the flap of the lens cover of FIG. 1a, shown removed from the base ring.
Figure 8:
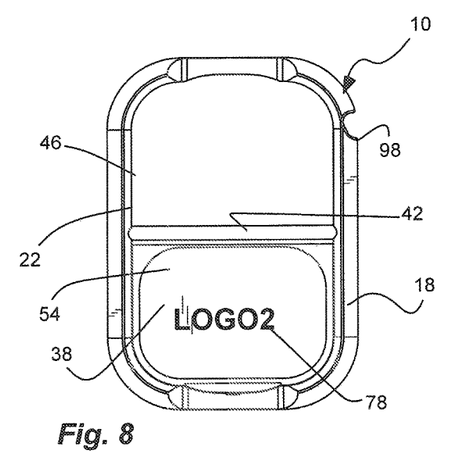
Figure 9:
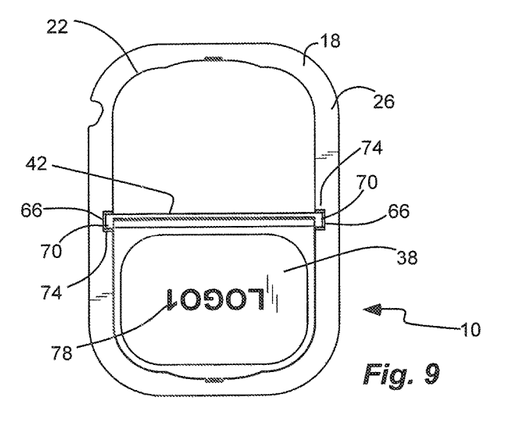
Figure 10:
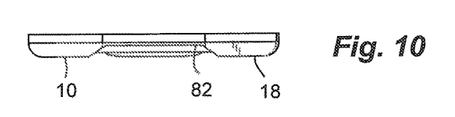
Figure 11:
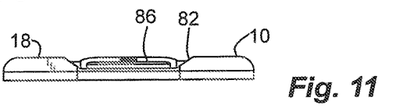
Figure 12:
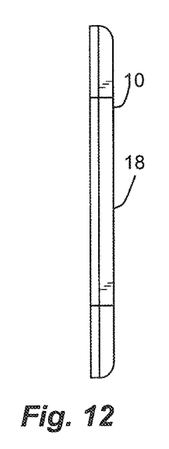
Figure 13:
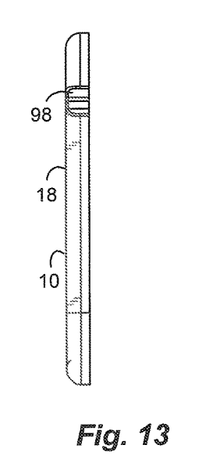
Figure 14A:
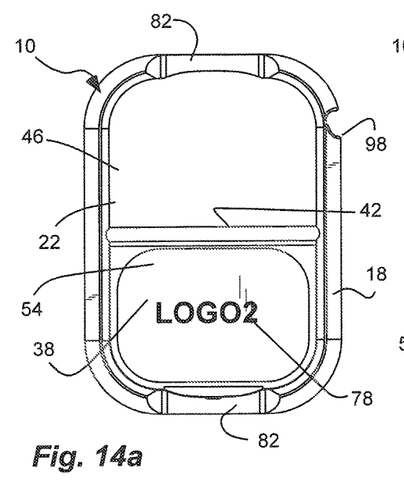
FIG. 14a is a front view of the lens cover of FIG. 1a, shown in the open position.
Figure 14B:
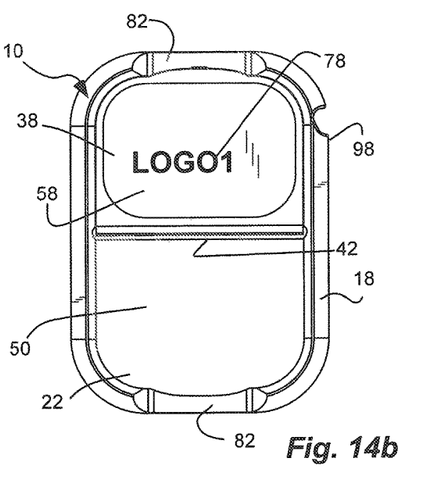
FIG. 14b is a front view of the lens cover of FIG. 1a, shown in the closed position.
Figure 15A:
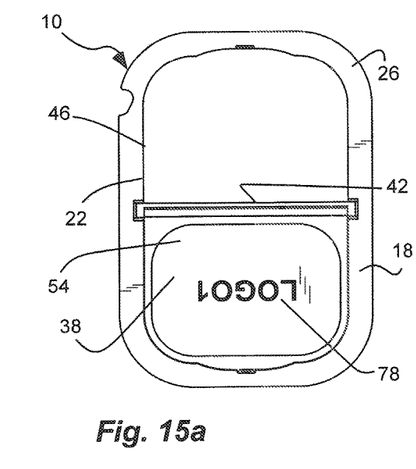
FIG. 15a is a rear view of the lens cover of FIG. 1a, shown in the open position.
Figure 15B:
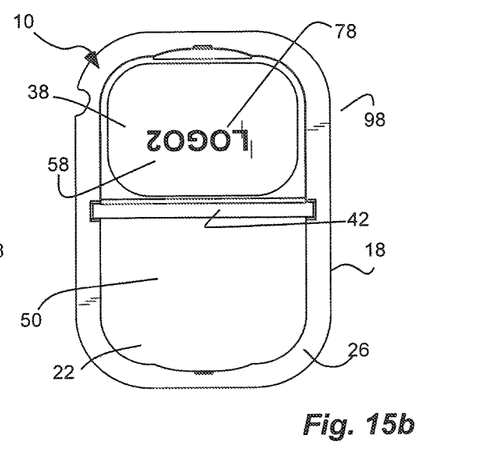
FIG. 15b is a rear view of the lens cover of FIG. 1a, shown in the closed position.

Referring to FIGS. 5a-7, in one aspect, the flap 38 is off-set with respect to the axle 42. A longitudinal axis of plane of the flap 38 does not intersect an axis of the axle 42. The flap 38 is not centered on the axle, as shown in FIG. 7. Thus, as shown in FIG. 5c, in the open position, the second side 58 of the flap 38 is closer to the inner side 26 of the base 18, and back 30 of the mobile device 14. As shown in FIG. 5a, in the closed position, the first side 54 is farther from the inner side 26 of the base 18, and the back 30 of the mobile device 14, creating a gap 62 to receive the camera lens 34 therein in the closed position. A closed distance between the first side 54 facing inward in the closed position and the inner side 26 of the base 18 or the back 30 of the mobile device 14 is greater than an open distance between the second side 58 facing outward in the open position and the inner side 26 of the base 18 or the back 30 of the mobile device. The off-set position of the flap 38 on the axle 42 allows for the creation of the gap 62 in the closed position, while maintain the thinness of the lens cover 10 and the base 18.

Referring to FIGS. 4-7 and 9, in one aspect, the axle 42, and thus the flap 38, can be snap-fit to the base 18 by a snap-fit. The snap-fit comprises opposing holes 66 (FIG. 6) in the base 18 spaced-apart from one another, and disposed on opposite sides of the aperture 22 and the base ring, and facing one another. The flap 38 and/or the axle 42 has opposite ends 70 pivotally disposed in the opposing holes 66, respectively. The opposite ends 70 of the axle 42 can extend laterally beyond the flap 38. In addition, opposite radial openings 74 can extend radially with respect to the axle 42 and into the opposing holes 66, respectively. The radial openings 74 are narrower than the opposing holes 66 and the opposite ends 70 of the axle 42. Thus, the opposite ends 70 of the axle 42 can be forced past the radial openings 74 and into the opposing holes 66.

In another aspect, the flap 38 can comprise indicia 78 on one or both of the opposite sides 54 and 58. The indicia 78 can be the same or different on different sides of the flap 38. The indicia 78 can be indicative of or represent a business, a product, or both. Thus, the lens cover can be used as a promotional product.

In another aspect, opposite finger notches 82 can be formed in opposite sides or ends of the based 18 or base ring, and on opposite sides of the axle 42, to allow engagement with the flap 38 to transition the flap between the open and closed positions. A channel 86 can be formed in the distal free end of the flap 38. The channel 86 can be exposed in both the open position and the closed position by the opposite finger notches 82. The channel 86 can be engaged by a fingernail of a user. The channel 86 can be off-set with respect to the flap 38, and aligned with the axle 42. Thus, the channel 86 can be positioned at either of the opposite finger notches 82, despite the flap 38 being off-set with respect to the axle 42.

In another aspect, a snap-fit can be formed between the distal free end of the flap 38 and the base 18 or the base ring to maintain the flap 38 in the respective open or closed position until moved by the user. The snap-fit comprise one or more detents extending from the base ring or the distal free end of the flap, and one or more dimples extending into the other of the distal free end of the flap or the base ring, and removably receiving the detent therein. For example, the flap 38 and/or the channel 86 can have a pair of detents 90 (FIG. 7) extending from the channel on opposite sides of the channel. The base 18 or the base ring can have a pair of dimples 94 (FIG. 6) disposed in the base or base ring on opposite sides, and adjacent the opposite finger notches 82. One of the pair of dimples removably receives one of the pair of dimples.

In another aspect, an exterior perimeter notch 98 can be formed in an exterior perimeter of the base 18 or the base ring. The notch 98 can align with a component of the mobile device 14, such as a microphone.

A method for selectively covering and exposing a camera lens 34 of a mobile device 14, and for using the lens cover 10 described above, comprises: securing a bas 10 or a base ring on the back 30 of the mobile device 14 with an aperture 14 of the base or the base ring over the camera lens 34, and with the base ring circumscribing the camera lens; and selectively folding a flap 38, pivotally coupled to the base ring by an axle 42 parallel with the back of the mobile device, 180 degrees between two positions, including: an open position and a closed position.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A lens cover configured to selectively cover and expose a camera lens on a mobile device, the lens cover comprising:
   a) a base with an inner side configured to be affixed to a back of the mobile device;
   b) a flap pivotally coupled to the base about an axle and having opposite sides;
   c) the flap folding 180 degrees about the axle and between two positions, comprising:
      i) an open position in which a first side of the flap faces outward opposite the inner side of the base, and a second side faces inward, configured to expose the camera lens; and
      ii) a closed position adjacent the open position in which the flap is folded 180 degrees and the second side of the flap faces outward opposite the inner side of the base, and the first side faces inward, configured to cover the camera lens; and
   d) the flap being off-set with respect to the axle so that in the open position the second side is closer to the inner side of the base, and in the closed position the first side is farther from the inner side of the base creating a gap configured to receive the camera lens in the closed position.

2. The lens cover in accordance with claim 1, further comprising:
   a) indicia on one or both of the opposite sides of the flap; and
   b) the indicia being indicative of or representing a business, a product, or both.

3. The lens cover in accordance with claim 1, further comprising:

an exterior perimeter notch formed in an exterior perimeter of the base, and configured to align with a component of the mobile device.

4. A lens cover configured to selectively cover and expose a camera lens on a mobile device, the lens cover comprising:
   a) a base with an inner side configured to be affixed to a back of the mobile device;
   b) a flap pivotally coupled to the base about an axle and having opposite sides; and
   c) the flap folding 180 degrees about the axle and between two positions, comprising:
      i) an open position in which a first side of the flap faces outward opposite the inner side of the base, and a second side faces inward, configured to expose the camera lens; and
      ii) a closed position adjacent the open position in which the flap is folded 180 degrees and the second side of the flap faces outward opposite the inner side of the base, and the first side faces inward, configured to cover the camera lens; and
   d) the axle being snap-fit to the base by a snap-fit comprising:
      i) opposing holes in the base spaced-apart from one another and facing one another;
      ii) opposite ends of the axle being pivotally disposed in the opposing holes, respectively;
      iii) opposite radial openings extending into the opposing holes, respectively, and extending radially with respect to the axle; and
      iv) the radial openings being narrower than the opposing holes and the opposite ends of the axle such that the opposite ends of the axle are capable of being forced past the radial openings and into the opposing holes.

5. A lens cover configured to selectively cover and expose a camera lens on a mobile device, the lens cover comprising:
   a) a base with an inner side configured to be affixed to a back of the mobile device and an aperture in the base defining a base ring;
   b) a flap pivotally coupled to the base about an axle and having opposite sides, the axle extending across the aperture, and dividing the aperture into a lens side and a storage side; and
   c) the flap folding 180 degrees about the axle and between two positions, comprising:
      i) an open position in which a first side of the flap faces outward opposite the inner side of the base, and a second side faces inward, configured to expose the camera lens; and
      ii) a closed position adjacent the open position in which the flap is folded 180 degrees and the second side of the flap faces outward opposite the inner side of the base, and the first side faces inward, configured to cover the camera lens; and
   d) the open position further comprising the flap covering the storage side of the aperture, and the closed position further comprising the flap covering the lens side of the aperture.

6. The lens cover in accordance with claim 5, wherein the flap nests within the aperture of the base ring in both the open position and the closed position.

7. The lens cover in accordance with claim 5, further comprising:
   a) opposite finger notches on opposite ends of the base ring and on opposite sides of the axle;
   b) a channel formed in a distal free end of the flap, the channel being exposed in both the open position and the closed position by the opposite finger notches; and
   c) the channel being off-set with respect to the flap.

8. The lens cover in accordance with claim 7, further comprising:
   a) a snap-fit formed between the distal free end of the flap and the base ring, the snap-fit comprising:
   b) at least one detent extending from the base ring or the distal free end of the flap; and
   c) at least one dimple extending into the other of the distal free end of the flap or the base ring, and removably receiving the detent therein.

9. A lens cover in combination with a mobile device to selectively cover and expose a camera lens on the mobile device, the lens cover comprising:
   a) a base ring disposed on a back of the mobile device and circumscribing the camera lens;
   b) a flap pivotally coupled to the base ring by an axle oriented parallel to the back of the mobile device, the axle positioned to extend across an aperture in the base ring and divide the aperture of the base ring into a lens side and a storage side; and
   c) the flap folding about the axle between two positions, comprising:
      i) an open position in which the flap covers the storage side and is adjacent the back of the mobile device and the camera lens is exposed; and
      ii) a closed position in which the flap covers the lens side and is disposed over the camera lens and above the back of the mobile device.

10. The combination in accordance with claim 9, wherein the flap folds 180 degrees about the axle and between the two positions.

11. The combination in accordance with claim 9, wherein the flap has opposite sides; and wherein the flap is off-set with respect to the axle so that in the open position a second side is closer to the back of the mobile device, and in the closed position a first side is farther from the back of the mobile device creating a gap receiving the camera lens in the closed position.

12. The combination in accordance with claim 9, further comprising:
   a) the axle being snap-fit to the ring base by a snap-fit comprising:
   b) opposing holes in the base ring spaced-apart from one another on opposite sides of the ring base and facing one another;
   c) opposite ends of the axle being pivotally disposed in the opposing holes, respectively;
   d) opposite radial openings extending into the opposing holes, respectively, and extending radially with respect to the axle; and
   e) the radial openings being narrower than the opposing holes and the opposite ends of the axle such that the opposite ends of the axle are capable of being forced past the radial openings and into the opposing holes.

13. The combination in accordance with claim 9, further comprising:
   a) the flap has opposite sides;
   b) indicia on one or both of the opposite sides of the flap; and
   c) the indicia being indicative of or representing a business, a product, or both.

14. The combination in accordance with claim 9, wherein the flap nests within the aperture of the base ring in both the open position and the closed position.

15. The combination in accordance with claim 9, further comprising:
   a) opposite finger notches on opposite ends of the base ring and on opposite sides of the axle;
   b) a channel formed in a distal free end of the flap, the channel being exposed in both the open position and the closed position by the opposite finger notches; and
   c) the channel being off-set with respect to the flap.

16. The combination in accordance with claim 15, further comprising:
   a) a snap-fit formed between the distal free end of the flap and the base ring, the snap-fit comprising:
   b) at least one detent extending from the base ring or the distal free end of the flap; and
   c) at least one dimple extending into the other of the distal free end of the flap or the base ring, and removably receiving the detent therein.

17. The combination in accordance with claim 9, further comprising:
   an exterior perimeter notch formed in an exterior perimeter of the base ring, and aligning with a component of the mobile device.

18. A method for selectively covering and exposing a camera lens of a mobile device, comprising:
   a) securing a base ring on the back of the mobile device with an aperture of the base ring over the camera lens and with the base ring circumscribing the camera lens; and
   b) selectively folding a flap, pivotally coupled to the base ring by an axle parallel with the back of the mobile device, 180 degrees between two positions, including:
      i) an open position in which the flap is adjacent the back of the mobile device and the camera lens is exposed; and
      ii) a closed position in which the flap is disposed over the camera lens and above the back of the mobile device.

* * * * *